United States Patent
Padovitz et al.

(10) Patent No.: US 8,140,567 B2
(45) Date of Patent: Mar. 20, 2012

(54) MEASURING ENTITY EXTRACTION COMPLEXITY

(75) Inventors: Amir J. Padovitz, Redmond, WA (US); Bala Meenakshi Nagarajan, Dayton, OH (US)

(73) Assignee: Microsoft Corporation, Redmond, WA (US)

( * ) Notice: Subject to any disclaimer, the term of this patent is extended or adjusted under 35 U.S.C. 154(b) by 206 days.

(21) Appl. No.: 12/759,513

(22) Filed: Apr. 13, 2010

(65) Prior Publication Data

US 2011/0252034 A1    Oct. 13, 2011

(51) Int. Cl.
*G06F 17/30* (2006.01)
*G06F 7/00* (2006.01)

(52) U.S. Cl. ......... 707/769; 707/770; 707/771; 707/780

(58) Field of Classification Search .................. None
See application file for complete search history.

(56) References Cited

U.S. PATENT DOCUMENTS

| | | |
|---|---|---|
| 6,192,360 B1 | 2/2001 | Dumais et al. |
| 6,212,532 B1 | 4/2001 | Johnson et al. |
| 7,028,250 B2 | 4/2006 | Ukrainczyk et al. |
| 7,237,137 B2 | 6/2007 | Goeller et al. |
| 7,558,778 B2 | 7/2009 | Carus et al. |
| 7,925,610 B2 * | 4/2011 | Elbaz et al. ................. 706/55 |
| 2002/0152051 A1 | 10/2002 | Fukushige et al. |
| 2003/0191625 A1 | 10/2003 | Gorin et al. |
| 2007/0233656 A1* | 10/2007 | Bunescu et al. ............. 707/3 |
| 2008/0243479 A1 | 10/2008 | Cafarella et al. |
| 2010/0223292 A1* | 9/2010 | Bhagwan et al. ............ 707/780 |

OTHER PUBLICATIONS

Angelova, Ralitsa., "Graph-Based Classification and Clustering of Entities in Heterogeneous Networks", Retrieved at << http://domino.mpi-inf.mpg.de/intranet/ag5/ag5publ.nsf/e1 27ff338913b2a3c12565f4005ef860/ 52de6083aac46318c12576c500368667/$FILE/Thesis.pdf >>, MPII WWW Server, MPII FTP Server, Dec. 18, 2009, pp. 187.

Nadeau, et al., "A survey of named entity recognition and classification", Retrieved at << http://nlp.cs.nyu.edu/sekine/papers/li07.pdf. >>, In Linguisticae Investigationes, vol. 30, No. 1, Jan. 2007, pp. 1-20.

Freund, et al., "A decision-theoretic generalization of on-line learning and an application to boosting", Retrieved at << http://www.face-rec.org/algorithms/Boosting-Ensemble/decision-theoretic_generalization.pdf >>, Journal of Computer and System Sciences, vol. 55, No. 1, Aug. 1997, pp. 119-139.

Berkhin, Pavel., "A survey on pagerank computing", Retrieved at << http://www.internetmathematics.org/volumes/2/1/Berkhin.pdf >>, Internet Mathematics, vol. 2, No. 1, Jul. 13, 2005, pp. 73-120.

Biemann, Chris., "Chinese whispers—an efficient graph clustering algorithm and its application to natural language processing problems", Retrieved at << http://wortschatz.uni-leipzig.de/~cbiemann/pub/2006/BiemannTextGraph06.pdf >>, Proceedings of the HLT-NAACL-06 Workshop on Textgraphs-06, 2006, pp. 8.

Breiman, Leo., "Bagging predictors", Retrieved at << http://hpcrd.lbl.gov/~meza/projects/MachineLearning/EnsembleMethods/breiman96bagging.pdf >>, Machine Learning, vol. 24, No. 2, Aug. 1996, pp. 20.

(Continued)

*Primary Examiner* — Jay Morrison
*Assistant Examiner* — Sangwoo Ahn

(57) ABSTRACT

A named entity input is received and a target sense for which the named entity input is to be extracted from a set of documents is identified. An extraction complexity feature is generated based on the named entity input, the target sense, and the set of documents. The extraction complexity feature indicates how difficult or complex it is deemed to be to identify the named entity input for the target sense in the set of documents.

12 Claims, 5 Drawing Sheets

OTHER PUBLICATIONS

Budanitsky, et al., "Evaluating wordnetbased measures of lexical semantic relatedness", Retrieved at << http://www.dit.unitn.it/~p2p/RelatedWork/Matching/Budanitsky+Hirst-2006.pdf >>, Computational Linguistics, vol. 32, No. 1, Mar. 2006, pp. 1-35.

Church, et al., "Word association norms, mutual information, and lexicography", Retrieved at << http://www.idc.upenn.edu/acI/J/J90/J90-1003.pdf >>, Computational Linguistics, vol. 16, No. 1, Mar. 1990, pp. 22-29.

Erkan, G Unes,., "Language model-based document clustering using random walks", Retrieved at << http://portal.acm.org/ft_gateway.cfm?id=1220896&type=pdf&coll=GUIDE&dl=GUIDE&CFID=77297004&CFTOKEN=74920880 >>, In Proceedings of the main conference on Human Language Technology Conference of the North American Chapter of the Association of Computational Linguistics 2006, Jun. 4-9, 2006, pp. 479-486.

Crestani, F., "Application of Spreading Activation Techniques in Information Retrieval", Retrieved at << http://www.springerlink.com/content/g11t185158667418/fulltext.pdf >>, Artificial Intelligence Review, vol. 11, No. 6, Dec. 1997, pp. 453-482.

Gruhl, et al., "Context and Domain Knowledge Enhanced Entity Spotting in Informal Text", Retrieved at << http://www.almaden.ibm.com/cs/projects/iis/hdb/Publications/papers/iswc2009.pdf >>, Lecture Notes In Computer Science, Proceedings of the 8th International Semantic Web Conference 2009, vol. 5823, Oct. 25-29, 2009, pp. 16.

He, et al., "An effective coherence measure to determine topical consistency in user-generated content", Retrieved at << http://staff.science.uva.nl/~mdr/Publications/Files/ijdar2009-he.pdf >>, International Journal on Document Analysis and Recognition, vol. 12, No. 3, Aug. 13, 2009, pp. 19.

Hughes, et al., "Lexical semantic relatedness with random graph walks", Retrieved at << http://www.stanford.edu/~dramage/papers/lexical-emnIp07.pdf >>, EMNLP-CoNLL, 2007, pp. 9.

Heafield, Kenneth., "Word Context Entropy", Retrieved at << http://kheafield.com/professional/google/revised.pdf >>, Google Incorporation, Jan. 16, 2008, pp. 31.

Lin, Dekang., "Automatic retrieval and clustering of similar words", Retrieved at << http://webdocs.cs.ualberta.ca/~lindek/papers/acl98.pdf >>, Proceedings of the 17th international conference on Computational linguistics, vol. 2, Aug. 10-14, 1998, pp. 8.

Lin, Jianhua., "Divergence measures based on the shannon entropy", Retrieved at << http://ieeexplore.ieee.org/stamp/stamp.jsp?tp=&arnumber=61115&userType=inst >>, IEEE Transactions on Information theory, vol. 37, No. 1, Jan. 1991, pp. 145-151.

Hurst, et al., "Social Streams Blog Crawler", Retrieved at << http://ieeexplore.ieee.org/stamp.jsp?tp=&arnumber=4812583 >>, Proceedings of the 2009 IEEE International Conference on Data Engineering 2009, Mar. 29-Apr. 2, 2009, pp. 1615-1618.

Navigli, Roberto., "Word sense disambiguation: A survey", Retrieved at << http://portal.acm.org/citation.cfm?id=1459355>>, ACM Computing Surveys (CSUR), vol. 41, No. 2, Feb. 2009, pp. 1-69.

Pado, et al., "Dependency-based construction of semantic space models", Retrieved at << http://citeseerx.ist.psu.edu/viewdoc/download?doi=10.1.1.86.2026&rep=rep1&type=pdf >>, Computational Linguistics, vol. 33, No. 2, Jun. 2007, pp. 1-40.

Pantel, et al., "Discovering Word Senses from Text", Retrieved at << http://eprints.kfupm.edu.sa/35226/1/35226.pdf >>, Proceedings of the eighth ACM SIGKDD international conference on Knowledge discovery and data mining, Jul. 23-26, 2002, pp. 7.

Quinlan, Ross J., "C4.5: Programs for Machine Learning", Retrieved at << http://www.springerlink.com/content/v986m1562062hk51/fulltext.pdf>>, Morgan Kaufmann Publishers Incorporation, Jan. 15, 1993, pp. 235-240.

Tsatsaronis, et al., "Word sense disambiguation with spreading activation networks generaed from thesauri", Retrieved at <<http://www.aaai.org/Papers/IJCAI/2007/IJCAI07-279.pdf >>, Proceedings of the 20th international joint conference on Artifical intelligence, Jan. 6-12, 2007, pp. 1725-1730.

Weeds, et al, "Co-occurrence re-trieval: A flexible framework for lexical distributional similarity", Retrieved at << http://www.mitpressjournals.org/doi/pdf/10.1162/089120105775299122?cookieSet=1 >>, Computational Linguistics, vol. 31, No. 4, Apr. 16, 2005, pp. 439-475.

Kozima, Hideki "Computing Lexical Cohesion as a Tool for Text Analysis", Doctoral Thesis, Course in Computer Science and Information Mathematics, Graduate School of Electro-Communications, (1993),40 pages.

Collins, Allan M., et al., "A Spreading-Activation Theory of Semantic Processing", Psychological Review 1975, vol. 82, No. 6, (1975),pp. 407-428.

\* cited by examiner

US 8,140,567 B2

MEASURING ENTITY EXTRACTION COMPLEXITY

BACKGROUND

As computers have become increasingly commonplace, a large amount of information has become available throughout the world. While having access to a large amount of information is useful, it is not without its problems. One such problem is that because of the large amount of information that is available, it can be difficult for users to find the particular information they are looking for. Users can end up with information they are not looking for and/or missing information that they are looking for.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a named entity input is received and a target sense for which the named entity input is to be extracted from a set of documents is identified. Based at least in part on both the named entity input and the set of documents, an extraction complexity feature is generated. The extraction complexity feature indicates how difficult or complex it is deemed to be to identify the named entity input for the target sense in the set of documents.

BRIEF DESCRIPTION OF THE DRAWINGS

The same numbers are used throughout the drawings to reference like features.

DETAILED DESCRIPTION

Measuring entity extraction complexity is discussed herein. The extraction complexity for a particular named entity input refers to how complex or difficult it is to identify the particular named entity input in a particular set of documents. A measurement of the extraction complexity is generated based on both the particular named entity input and the particular set of documents from which the particular named entity input is to be extracted. The measurement of the extraction complexity is also based on a target sense, which refers to the particular desired sense or usage of the named entity input in the set of documents. The measurement of the extraction complexity can then be used in identifying the particular named entity input in the particular set of documents.

Figure 1:
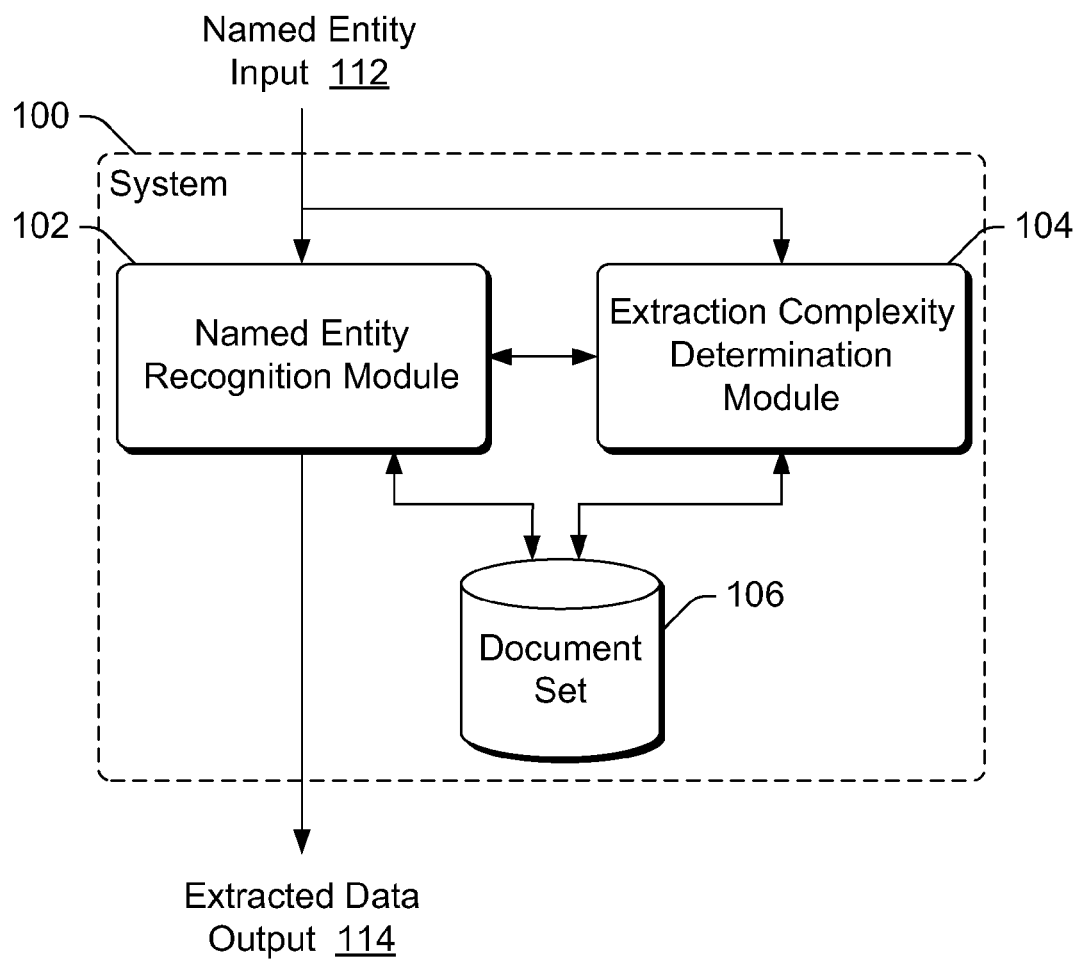
FIG. 1 illustrates an example system implementing the measuring entity extraction complexity in accordance with one or more embodiments.

FIG. 1 illustrates an example system 100 implementing the measuring entity extraction complexity in accordance with one or more embodiments. System 100 includes a named entity recognition module 102, an extraction complexity determination module 104, and a document set 106, each of which can be implemented by one or more computing devices. Named entity recognition module 102, extraction complexity determination module 104, and document set 106 can be implemented by a variety of different types of computing devices, such as a desktop computer, a mobile station, an entertainment appliance, a set-top box communicatively coupled to a display device, a television, a cellular or other wireless phone, a game console, an automotive computer, and so forth. Each of named entity recognition module 102, extraction complexity determination module 104, and document set 106 can be implemented by the same computing device, or alternatively by different computing devices of the same or different types.

System 100 receives a named entity input 112 and generates, based on named entity input 112 and document set 106, an extracted data output 114. Named entity input 112 is an indication of a particular entity that is desired to be identified from document set 106. An entity can be a person, a place, a thing, and so forth. Named entity input 114 can be a variety of different types of entities, such as a name (e.g., of a person, of a company, of a place, etc.), a title (e.g., of a person, of a movie, of a book, etc.), a location (e.g., an address, global positioning system (GPS) coordinates, etc.), and so forth. Document set 106 stores data as a set of documents. Each of these documents can store data in a variety of different formats, such as HyperText Markup Language (HTML) Web pages, social networking site Web pages, eXtensible Markup Language (XML) documents, documents stored by various word processing or other computer programs, and so forth. Document set 106 can include documents stored together (e.g., in a same database or on the same computing device), and/or documents stored on multiple computing devices (e.g., different computing devices accessed via a network such as the Internet). Named entity input 112 is received from a source, such as a user, a component, a module, a device, and so forth.

Extracted data output 114 is an indication of the named entity input 112 that occurs in document set 106. Extracted data output 114 can be the documents from document set 106 that include named entity input 112, or alternatively only portions of those documents (e.g., paragraphs or other portions of those documents that include named entity input 112). Alternatively, extracted data output 114 can be an indication of where the documents in document set 106 that include named entity input 112 are located (e.g., pointers or links to the documents).

Named entity recognition module 102 identifies a target sense for named entity input 112 in the set of documents that is document set 106 and generates extracted data output 114. The target sense refers to the particular desired sense or usage of named entity input 112 in document set 106. The same named entity input 112 can have multiple different senses (e.g., a name can be used as the title of a movie, the title of a book, the title of a video game, and/or have other meaning in the documents of document set 106).

For example, assume that a user desires to identify documents from document set 106 that include references to the movie named "Star Trek". In this example, "Star Trek" refers to the named entity input 112, and the target sense of named entity input 112 is a movie. Some occurrences of "Star Trek" in documents of document set 106 would most likely refer to the movie "Star Trek", although other occurrences of "Star Trek" might refer to entities other than the movie "Star Trek", such as a video game named "Star Trek", a novel named "Star Trek", a comic book named "Star Trek", and so forth. By way of another example, assume a user desires to identify documents from document set 106 that include references to a movie named "Twilight". In this example, the target sense of named entity input 112 is a movie. Some occurrences of "Twilight" in documents of document set 106 would most likely refer to the movie "Twilight", although other occurrences of "Twilight" might refer to entities other than the movie "Twilight", such as a novel named "Twilight", a time of day, and so forth. Thus, it is to be appreciated that identifying named entity input 112 in the data in document set 106 involves more than simply searching for the presence of named entity input 112 in document set 106.

The target sense for named entity input 112 can be identified in different manners. In one or more embodiments, the target sense of named entity input 112 is included as part of named entity input 112. In other embodiments, the target sense of named entity input 112 is included as a separate input provided to system 100 (e.g., typically received from the same source as named entity input 112 is received). In other embodiments, system 100 is configured with (or otherwise has access to or knowledge of) the target sense. For example, different named entity recognition modules 102 and extraction complexity determination modules 104 can be used for different target senses.

Named entity recognition module 102 identifies named entity input 112 in the set of documents that is document set 106 and generates extracted data output 114. Named entity recognition module 102 can use a variety of different techniques to generate extracted data output 114, such as any of a variety of different conventional machine learning classifiers (such as decision trees, bagging, boosting decision trees, etc.). Named entity recognition module 102 can use a variety of different features in identifying named entity input 112 in the data of document set 106, such as whether named entity input 212 is capitalized in documents of document set 106, whether named entity input 212 is within quotation marks in documents of document set 106, other words or phrases that are adjacent to named entity input 112 in documents of document set 106, and so forth.

Additionally, extraction complexity determination module 104 generates an extraction complexity for named entity input 112, which is an indication of how complex (also referred to as how difficult) the identification of named entity input 112 for the target sense is deemed to be. The extraction complexity generated by extraction complexity determination module 104 is the extraction complexity for the target sense of named entity input 112 based on document set 106. The complexity of the identification of named entity input 112 can thus vary based on one or more of the named entity input 112 itself, the target sense of named entity input 112, and the documents in document set 106. For example, it can be deemed to be more complex to identify a movie named "Twilight" in the data of document set 106 than a movie named "Star Trek" because the word "Twilight" can typically be used in a larger number of different ways (other than as a movie title) than the phrase "Star Trek" can typically be used.

Extraction complexity determination module 104 generates the extraction complexity for named entity input 112 and provides this generated extraction complexity (also referred to as an extraction complexity measurement) to named entity recognition module 102. Extraction complexity determination module 104 uses the generated extraction complexity for named entity input 112 as a feature in identifying named entity input 112 in the data of document set 106. Thus, the identification of named entity input 112 in the data of document set 106 is based at least in part on the complexity of identifying named entity input 112.

It should be noted that system 100 is referred to as an open system rather than a closed system. In a closed system, a named entity recognition module has knowledge of all the different senses in which a named entity input can be used (for example, a particular number of movie titles that include the input, a particular number of novel titles that include the input, and a particular number of video game titles that include the input). However, in an open system, the named entity recognition module has no such knowledge of all the different senses in which a named entity input can be used. Thus, named entity recognition module 102 does not have knowledge of all the different senses in which named entity input 112 can be used.

Figure 2:
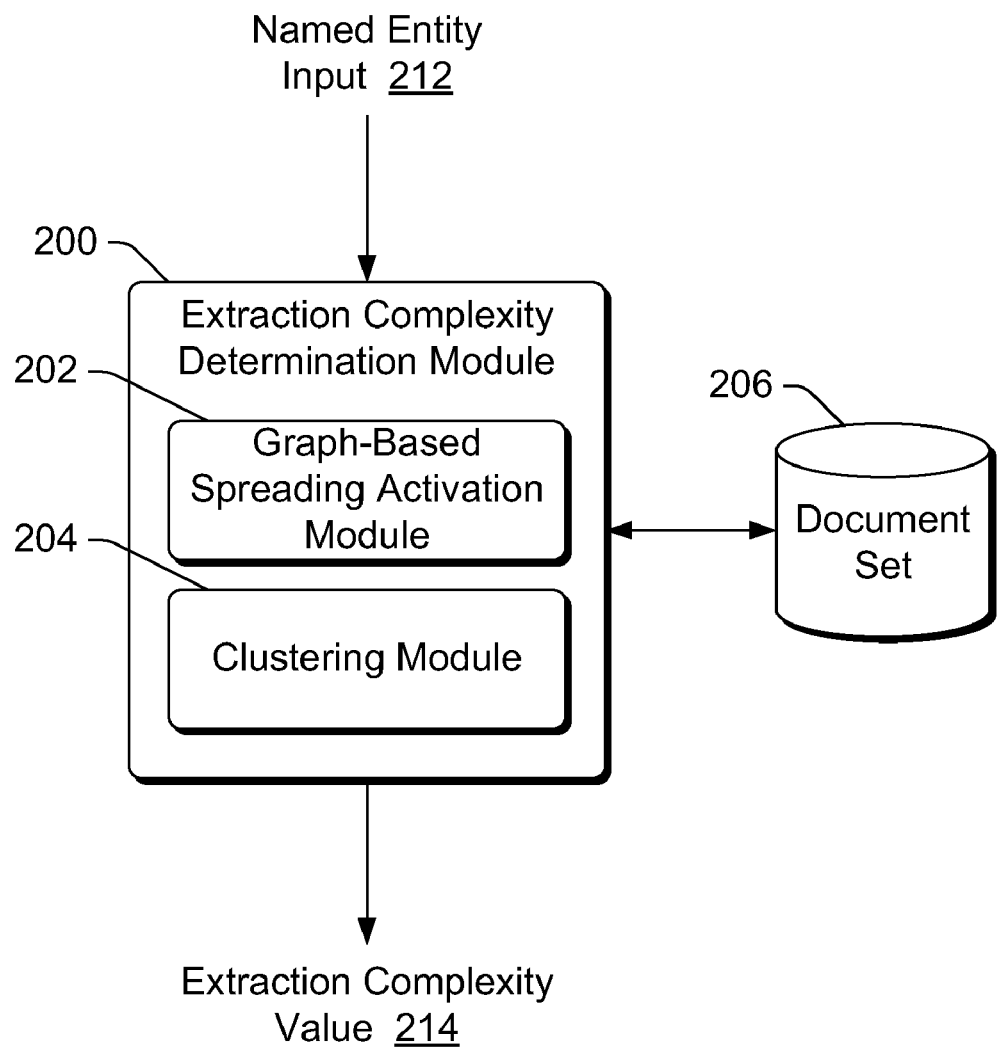
FIG. 2 illustrates an example extraction complexity determination module in accordance with one or more embodiments.

FIG. 2 illustrates an example extraction complexity determination module 200 in accordance with one or more embodiments. Extraction complexity determination module 200 can be, for example, an extraction complexity determination module 104 of FIG. 1. Extraction complexity determination module 200 is coupled to document set 206 (which can be a document set 106 of FIG. 1), and receives a named entity input 212 (which can be a named entity input 112 of FIG. 1). Extraction complexity determination module 200 also identifies a target sense for named entity input 212, analogous to the target sense for named entity input 112 discussed above. Although discussions of named entity input 212 being a word are included herein, it is to be appreciated that named entity input 212 can be any sequence of symbols or characters, such as individual words, parts of words, strings of words, strings of other alphanumeric characters or symbols, images, and so forth.

Extraction complexity determination module 200 includes a graph-based spreading activation module 202 and a clustering module 204. Generally, extraction complexity determination module 200 receives a named entity input 212. Graph-based spreading activation module 202 performs a graph-based spreading activation technique based on both named entity input 212 and the data in document set 206 to generate an initial extraction complexity value. Clustering module 204 then performs a clustering technique based on the results of the graph-based spreading activation technique performed by module 202 and generates a refined initial extraction complexity value or measurement. The extraction complexity value generated by clustering module 204 is output as the extraction complexity value 214 for named entity input 212, which can be used as a feature by a named entity recognition module as discussed above.

Graph-based spreading activation module 202 operates based on an undirected graph built based on documents in document set 106 that include named entity input 212. A value D refers to a set of all of the documents d in document set 206 in which a particular entity e (which is named entity input 212) occurs. This value D can be defined as $D=\{d_i\}_{i=1 \text{ to } n}$, where the set includes n documents. The occurrences of entity e are defined as $E=\{e_c\}_{c=1 \text{ to } q}$, where entity e occurs in a number q documents. These occurrences E are regarded as valid occurrences of entity e if the occurrences appear in a particular manner. For example, these occurrences E are regarded as valid occurrences of entity e if the occurrences 1) appear within quotes, start with capitalized letters, or are all capitalized, and 2) do not occur as part of another candidate entity. E.g., if the entity e is "Up", then an occurrence of "WHAT GOES UP" is not an occurrence of the entity e (e.g., due to its being surrounded by other capitalized words in quotes).

A sense definition of entity e refers to a list of words that are deemed as sufficiently describing the meaning of entity e for the target sense of entity e. Sense definitions are also referred to as sense hints. Sense definitions can be obtained from a variety of different sources, such as from a database or other record of entities typically associated with the entity e, from manual entry of definitions by a user, and so forth. In one or more embodiments, sense definitions are obtained from two different sources. The sense definitions obtained from the first source are referred to as $S=\{s_j\}_{j=1 \text{ to } m}$, where m refers to the number of sense definitions obtained from the first source. This first source is a database of information, such as entries located in an Infobox portion of a Wikipedia® encyclopedia entry for the entity e. This database of information includes a list of entities that have been designated by another component, module, and/or user as being contextually associated with and typically used in reference to entity e. The second source is a list of sense definitions referred to as $S_d$, which are manually selected words describing the domain of the entity e. These manually selected words can be obtained in different manners, such as manual selection by a user of the system including extraction complexity determination module 200. For example, for an entity e for the movie "Star Trek", the sense hints can be S={J. J. Abrams, Damon Lindelof, Chris Pine, James T. Kirk, Spock, Carl Urban} obtained from the first source, and $S_d$={movie, theatre, film, cinema} that are words indicating the domain of interest (which is movies) obtained from the second source.

An undirected graph G can be built from documents D such that vertices $X=\{x_i\}_{i=1 \text{ to } q}$ are co-occurring words or contexts surrounding occurrences E in documents D. Vertices in undirected graph G are also referred to as nodes. It should be noted that the vertices X do not include the entity e itself. Additionally, vertices X are either labeled or unlabeled. All vertices x, belonging to sense definitions S and $S_d$ are labeled as sense tag vertices or sense hints and denoted by $Y=\{y_g\}_{g=1 \text{ to } z}$, where g refers to the number of vertices $x_i$ belonging to sense definitions S and $S_d$. All other vertices $x_i$ are unlabeled and retained in vertices X. Edges connecting two vertices in undirected graph G indicate co-occurrence strengths of words in a same paragraph.

Accordingly, obtaining the extraction complexity of entity e can be referred to as looking for contexts in undirected graph G (words co-occurring with entity e in documents D) that are strongly related to the target sense definition of entity e (as encoded by vertices Y in undirected graph G). In one or more embodiments, the extraction complexity of entity e is obtained by propagating the sense definition in vertices Y through undirected graph G to identify associated contexts in undirected graph G. Greater contextual support for entity e results in entity e being easier to extract and thus having a lower extraction complexity value.

As indicated above, graph-based spreading activation module 202 performs a graph-based spreading activation technique based on both named entity input 212 and the data in document set 206 to generate an initial extraction complexity value. To determine how much support exists for the target sense of entity e, the sense definitions in vertices Y are propagated through weighted edges in undirected graph G. This propagation activates parts of graph G that are strongly associated with vertices Y. In other words, this propagation extracts a language model of words that are strongly biased to the target sense of entity e as per the sense definitions in vertices Y. This graph-based spreading activation technique is discussed in more detail below.

Also as indicated above, clustering module 204 performs a clustering technique based on the results of the graph-based spreading activation technique performed by module 202. Clustering module 204 uses the extracted language model from graph-based spreading activation module 202 to learn a classification plane for identifying documents that are more likely to mention entity e in the target sense and those that are not more likely to mention entity e in the target sense, resulting in clustering by the same dimensions of propagation. The greater the number of documents indicating support for the entity e in the target sense, the lower the extraction complexity value of the entity e. This clustering technique is discussed in more detail below.

Graph-Based Spreading Activation Technique

Spreading activation theory is used to propagate the influence (label) of the sense definition of entity e to identify contexts in the data in database 206 that are relevant to the target sense. In spreading activation, label information of vertices in a graph (which is referred to as a spreading activation network or SAN) is propagated to nearby vertices through weighted edges. Typically, multiple pre-selected source vertices are used as pulse nodes to propagate or spread their values in a sequence of iterations to activate other vertices in the graph. The activation process starts with initialization where node and edge weights are determined. Subsequent propagation of labels and termination of the spreading activation are controlled by appropriate parameters. By traversing all links in a network, the spreading activation aggregates local similarity statistics across the entire word distribution graph. The following process is an example of a graph-based spreading activation technique that can be used by graph-based spreading activation module 202.

The graph-based spreading activation technique uses three phases: a pre-adjustment phase, a propagation phase, and a termination phase. The following is an overview of these three phases, and then a discussion of these three phases in additional detail.

In the pre-adjustment phase, the undirected graph G, which is also referred to as the SAN from words surrounding entity e in documents D, is built. Weights (also referred to as scores) for the sense hint nodes and other vertices (vertices Y and vertices X, respectively) are initialized, paying particular attention to the weighting of sense hint nodes that might not truly represent the target sense of entity e. In the pre-adjustment phase, co-occurrence edge weights are also initialized.

In the propagation phase, the sense hint nodes in vertices Y are used as pulse nodes and a number of iterations (e.g., equal to |Y|) of a propagation algorithm are run. Each iteration propagates the relevance of the pulsed sense hint node $y_g$ through the co-occurrence weighted edges to increment the scores of vertices in graph G that are touched. Each of the iterations adds to the results of the previous iterations, effectively propagating the cumulative relevance of the sense hint nodes through graph G. At the end of the number of iterations, nodes in graph G with the highest scores are those that are strongly associated with multiple sense hint nodes.

In the termination phase, the scores of activated nodes (those nodes whose weights have changed because of the propagation) are normalized to obtain a language model. This language model represents words and the strength of their associations with the target sense of entity e.

In the pre-adjustment phase, the undirected graph G is built. The SAN is the undirected graph G built from contexts or words surrounding entity e. The SAN is constructed based at least in part on inverse document frequency (IDF) techniques, which assign values to terms in a particular document indicating how important the terms are to the particular document. IDF techniques are typically based at least in part on a number of times the terms appear in the particular document as well as the number of times the terms appear in other documents of the document set of which the particular document is a part. A variety of different conventional inverse document frequency techniques can be used in constructing the SAN. The SAN is constructed as follows. For each document $d_i$ in documents D that includes an entity occurrence $e_c$, the top T IDF terms in document $d_i$ are extracted. Typical values for T range from 20 to 100. $IDF_i$ refers to the top T IDF terms for document $d_i$. Additionally, if a sense hint $s_g$ in sense definitions S or in sense definitions $S_d$ is included in document $d_i$, then the sense hint $s_g$ is force-added to $IDF_i$ regardless of the $IDF_i$ score of the sense hint $s_g$.

The terms in $IDF_i$ are used as the vertices in graph G. An edge is created between two vertices if the vertices co-occur in the same paragraph in any document $d_i$. The weight on the edge is the total number of such contextual co-occurrences in all documents in documents D. These edges between vertices are undirected. Sense hints in $IDE_i$ (those that were force-added to $IDF_i$) are the vertices Y in graph G, and are referred to as sense hint nodes. The other nodes in $IDF_i$ (those that were not force-added to $IDF_i$) are the unlabeled vertices X in graph G.

Weight assignments for the sense hint nodes and the unlabeled vertices are derived based on their relevance to the target sense of entity e. The sense hint vertices Y in graph G are initially assigned a high weight of 1 indicating a high (e.g., maximum) relevance to the sense of entity e. The unlabeled vertices X in graph G are initially assigned a low weight of 0.1.

It should be noted that sense hints themselves can have some ambiguity because they can be associated with more than one sense (and not just the target sense). For example, "Kirk" can be a strong sense hint for the movie sense of the entity "Star Trek", but is also relevant in the video game sense and the novel sense. Depending on the underlying distribution in documents D, propagating the importance of "Kirk" can activate multiple portions (words) of graph G, some of which can be unrelated to the target sense.

Furthermore, as graph-based spreading activation module 202 is operating in an open system, module 202 does not have any pre-determined information regarding which of sense hint vertices Y in graph G have multiple associated senses. Accordingly, graph-based spreading activation module 202 attempts to identify which of the sense hint vertices Y in graph G are relevant in senses that are different from the target sense, with respect to the distribution of documents D. The relevance of sense hint vertices Y in graph G that are relevant in senses different from the target sense are propagated through graph G less than the sense hint vertices Y in graph G that are relevant to only the target sense.

The sense hint vertices Y in graph G that are relevant in senses that are different from the target sense can be identified in different manners. In one or more embodiments, the sense hint vertices Y in graph G that are relevant in senses that are different from the target sense are identified based on the sense definitions $S_d$. The similarity between the sense hint vertices $y_g$ and the sense definitions $S_d$, referred to as $Sim(y_g, S_d)$, is measured. This similarity $Sim(y_g, S_d)$ partially defines the target sense. Lower $Sim(y_g, S_d)$ values indicate insufficient context for vertex $y_g$ in documents D or that contexts surrounding $y_g$ are different from the contexts surrounding the sense definitions $S_d$.

For every sense hint vertex $y_g$ in vertices Y, an independent (non-cumulative) pulse is issued that propagates the importance of sense hint vertex $y_g$ throughout graph G. This pulse activates words that are related to the sense hint vertex $y_g$ and eventually results in a language model that includes words and their relatedness only to sense hint vertex $y_g$. A vector constructed from this language model using sense hint vertex $y_g$ as the pulse node is denoted as $LM(y_g)$. For each vertex $y_g$, the total dot product similarity of the term vector $LM(y_g)$ of the vertex $y_g$ with the vectors of all sense hints in sense definitions $S_d$ that are also in vertices Y is computed as follows:

$$Sim(y_g, S_d) = \sum_{i=1}^{|S_d|} LM(S_{d_i}) \cdot LM(y_g)$$

This dot product similarity allows a measurement of how close a sense hint $y_g$ is to the non-ambiguous domain sense hints that partially define the target sense. Because the similarity is measured using the extracted language models, the similarity reflects the underlying distribution in documents D.

Higher similarity scores indicate that the sense hint vertex $y_g$ is a strong target sense hint with respect to the distribution in documents D. If the similarity score is above a threshold $\gamma$, then the initial weight of vertex $y_g$ (e.g., 1) is amplified by this score. Typical values for $\gamma$ range from 0.7 to 0.95. Otherwise, vertex $y_g$ is removed from vertices Y but retained in graph G as an unlabeled vertex $x_i$ of vertices X with an initial weight of 0.1. However, it should be noted that a different $S_d$ could indicate the relevance of a vertex $y_g$ to the target sense, and such relevance can be determined at the end of the propagation.

In the propagation phase, the sense hint nodes in vertices Y are used as pulse nodes and a number of iterations of a propagation algorithm are run. Graph-based spreading activation module 202 uses a propagation algorithm that propagates the weight (which indicates the relevance to the target sense) of each labeled vertex $y_g$ through the weighted edges in graph G. Each vertex $y_g$ corresponds to one pulse or iteration that initiates propagation, resulting in |Y| iterations.

In one or more embodiments, the propagation algorithm used by graph-based spreading activation module 202 operates as follows. For each sense hint vertex $y_g$, a walk through undirected graph G is initiated. Sense hint vertices $y_g$ can be selected in different manners (e.g., randomly or according to some other rules or criteria). Starting with a sense hint $y_g$ as the anchor, a breadth first search (BFS) walk through undirected graph G is initiated and the weight of $y_g$ is propagated through the undirected graph G. During an iteration, the propagation amplifies the score of any vertex $x_i$ or $y_g$ through which the walk proceeds. For example, assume an instance of the BFS walk from vertex i to j in undirected graph G. The weight of vertex j in iteration iter is amplified as follows:

$$w[j]_{iter} = w[j]_{(iter-1)} + (w[i]_{iter} * co\text{-}occ[i,j] * \alpha)$$

where co-occ[i, j] refers to the co-occurrence strength or edge weight on the edge connecting vertices i and j, $w[j]_{iter}$ refers to the weight of vertex i during iteration iter, and $\alpha$ refers to a dampening factor.

In an iteration of the BFS walk starting at a vertex $y_g$, vertices can be revisited but edges are not revisited, effectively allowing the weight of a vertex to be amplified by all of its incoming edges (in other words, by all co-occurring words). The propagation is controlled by a dampening factor $\alpha$ that diminishes the effect of the propagation the farther a node is from the source sense hint node. Typical values for $\alpha$ range from 0.5 to 0.9. Additionally, a threshold value $\beta$ on the co-occurrence weights also controls when the propagation ceases to continue. For example, if words in vertices i and j co-occur less than the threshold value $\beta$ number of times, the weight of vertex i does not propagate through graph G via vertex j. Typical values for β range from 2 to 5.

The propagation algorithm used by graph-based spreading activation module 202 operates without normalizing edge weights by the degree of outgoing edges. Alternatively, the edge weights in undirected graph G can be normalized by the degree of outgoing edges. Additionally, although the propagation algorithm used by graph-based spreading activation module 202 is discussed as performing a BFS walk through undirected graph G, walks through undirected graph G using other techniques can alternatively be performed. For example, rather than a BFS walk a random walk through undirected graph G can be performed.

In the termination phase, scores of activated nodes are normalized to obtain a language model. The propagation algorithm used by graph-based spreading activation module 202 terminates after the appropriate number of iterations have been performed (e.g., |Y| iterations). After the propagation algorithm terminates, the vertices in undirected graph G that were activated or touched in any of the iterations have weights larger than their initial weights, and the vertices in undirected graph G that were not activated or touched in any of the iterations have unchanged scores.

Graph-based spreading activation module 202 normalizes the scores of the vertices in undirected graph G between 0 and 1 so that the vertices that were not activated or touched have a score of 0 while the vertices that were activated or touched have scores that are proportionately weighted based on the highest activation score received by the vertices in undirected graph G. In one or more embodiments, graph-based spreading activation module 202 normalizes the scores of the vertices in undirected graph G as follows:

$$norm-score(vertex) = \frac{prop-score(vertex) - prop-score(G)_{min}}{prop-score(G)_{max} - prop-score(G)_{min}}$$

where norm−score(vertex) refers to the normalized score for a vertex, prop−score(vertex) refers to the activation score of the vertex after the propagation algorithm has terminated, prop−score(G)$_{min}$ refers to the minimum activation score of vertices in undirected graph G after the propagation algorithm has terminated, and prop−score(G)$_{max}$ refers to the maximum activation score of vertices in undirected graph G after the propagation algorithm has terminated.

Graph-based spreading activation module 202 generates a language model for an entity e, which is referred to as LM$_e$. The language model LM$_e$ includes the words in undirected graph G with normalized activation scores greater than 0. In light of the node weighting and propagation through undirected graph G, the normalized activation score of a word in LM$_e$ is proportional to the relevance of that word to the target sense with respect to the documents D.

Clustering Technique

Clustering module 204 uses a clustering technique to refine the language model LM$_e$ generated by graph-based spreading activation module 202. Clustering module 204 represents the documents D as a vector of terms. The vector does not necessarily include all of the documents D, but rather includes those documents D having words in the language model LM$_e$ for the entity e. Weights of terms in the term vector are obtained from the extracted language model LM$_e$, and represent the relatedness of the term to the target sense. The term vector can be as follows:

$$d_i(LM_e) = \{w_1, LM_e(w_1); w_2, LM_e(w_2); \ldots; w_x, LM_e(w_x)\}$$

where $w_i$ refer to words overlapping with document $d_i$ and language model LM$_e$, LM$_e(w_i)$ refers to the relatedness of $w_i$ to the target sense from the language model LM$_e$. The relatedness of a document $d_i$ to the target sense is proportional to the relatedness strengths of the words $w_i$, LM$_e(w_i)$ in the document $d_i$.

Clustering module 204 can use a variety of different clustering techniques to refine the language model LM$_e$ generated by graph-based spreading activation module 202. In one or more embodiments, clustering module 204 uses a graph-based clustering algorithm such as the Chinese Whispers clustering algorithm. Additional information regarding the Chinese Whispers clustering algorithm can be found in "Chinese Whispers—an Efficient Graph Clustering Algorithm and its Application to Natural Language Processing Problems", by Chris Biemann, Proceedings of TextGraphs: the Second Workshop on Graph Based Methods for NLP (2006). Alternatively, other clustering algorithms can be used.

Using the Chinese Whispers clustering algorithm, clustering module 204 essentially places each node into its own cluster, sorts the nodes in random order, and assigns each node to the most popular cluster in the neighborhood of that node. The popularity of a cluster refers to the sum of the node weightings in that cluster. This assigning is repeated until a fixed point is reached (in other words, until repeating this assigning does not alter the clusters). The nodes when using the Chinese Whispers clustering algorithm are documents represented by their term vectors $d_i(LM_e)$. Edges represent the similarity between the documents in terms of the dot-product similarities of their term vectors. Using the Chinese Whispers clustering algorithm, the documents are grouped together in clusters based on their average maximum similarity (in terms of their term vectors) with documents in other clusters.

By grouping together documents that have common words, documents including the entity e for different senses tend to be grouped together. Accordingly, documents including the entity e for the target sense tend to be more easily separated from documents including the entity e in other senses.

The relatedness of a cluster to the target sense (by extension of the relatedness of a document to the target sense) is as high as the relatedness strengths of the words in the cluster. Accordingly, higher scoring clusters have a greater chance of containing documents that mention the entity e in the target sense than lower scoring clusters. In one or more embodiments, clustering module 204 determines a relatedness scored for a cluster as follows:

$$relatedness-score(C_k) = \sum_{i=1 \text{ to } n} count(w_i) * LM_e(w_i)$$

where relatedness−score($C_k$) refers to the relatedness score for a cluster $C_k$, $W_i$ refers to all words in documents in cluster $C_k$, count($w_i$) refers to the number of times the word occurs in documents in cluster $C_k$, and LM$_e(w_i)$ refers to the relatedness of the word $w_i$ to the target sense from LM$_e$.

Clustering module 204 then generates an extraction complexity for entity e based on how many documents $d_i$ of documents D indicate a strong support for extracting entity e in the target sense. The stronger the support for extracting entity e in the target sense, the lower the extraction complexity for entity e in the target sense.

In one or more embodiments, clustering module 204 generates the extraction complexity for entity e as follows. An average score of all clusters, referred to as avg(C), is calculated. The clusters having a score greater than avg(C) are selected and referred to as C*. The extraction complexity is determined as the proportion of all documents in which entity e occurs and the number of documents in clusters C* in which there is a high likelihood of entity e in the target sense occurring. For example, the extraction complexity can be determined as follows:

$$\text{complexity of extraction of } e = \frac{1}{|C^*|/|D|}$$

where "complexity of extraction of e" refers to the extraction complexity of entity e for the target sense, |C*| refers to the number of documents in C*, and |D| refers to the number of documents in D.

Various techniques are discussed herein for performing the graph-based spreading activation and clustering. It is to be appreciated, however, that these discussed techniques are examples, and that other techniques for performing graph-based spreading activation and/or clustering can alternatively be used with the measuring entity extraction complexity techniques discussed herein.

Figure 3:
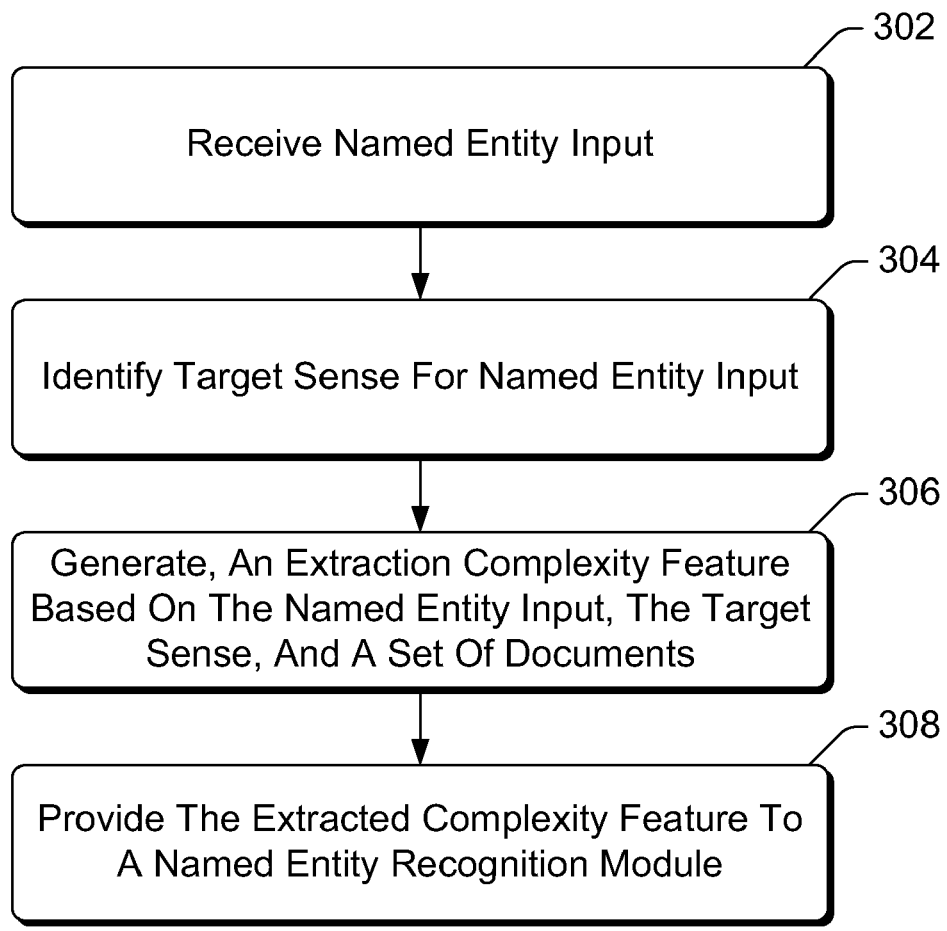
FIG. 3 is a flowchart illustrating an example process for measuring and using entity extraction complexity in accordance with one or more embodiments.

FIG. 3 is a flowchart illustrating an example process 300 for measuring and using entity extraction complexity in accordance with one or more embodiments. Process 300 is carried out by a system, such as system 100 of FIG. 1, and can be implemented in software, firmware, hardware, or combinations thereof. Process 300 is shown as a set of acts and is not limited to the order shown for performing the operations of the various acts. Process 300 is an example process for measuring and using entity extraction complexity; additional discussions of measuring and using entity extraction complexity are included herein with reference to different figures.

In process 300, a named entity input is received (act 302). A variety of different types of entities can be received as the named entity input as discussed above.

A target sense for the named entity input is identified (act 304). The target sense can be identified in different manners as discussed above.

An extraction complexity feature is generated for the received named entity input (act 306). The extraction complexity feature is a measurement of the entity extraction complexity and is generated based on the named entity input itself, the target sense, and a set of documents as discussed above.

The extracted complexity feature can be provided to a named entity recognition module (act 308). The named entity recognition module can use the extracted complexity feature to extract the named entity input for the target sense from the set of documents as discussed above.

Figure 4:
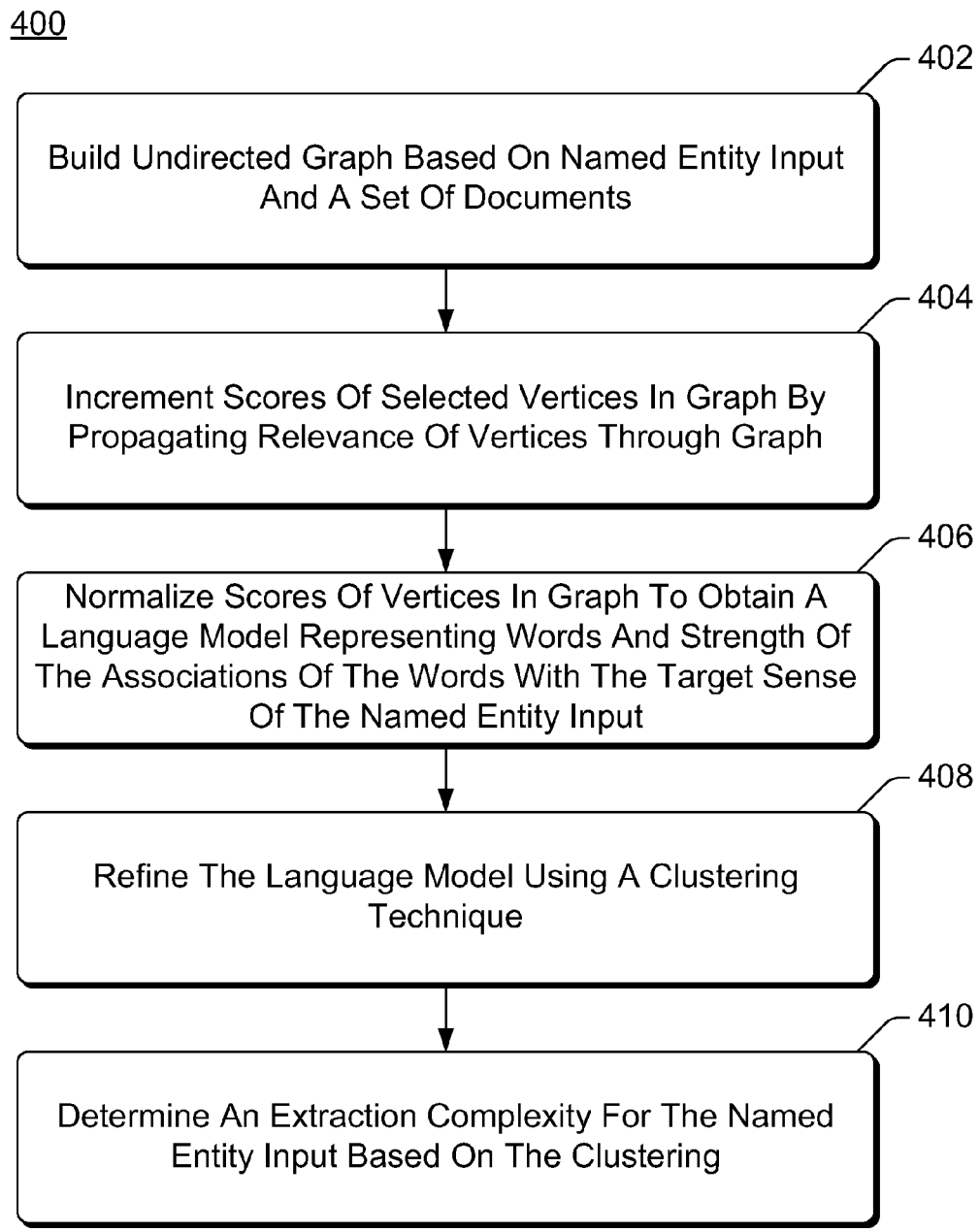
FIG. 4 is a flowchart illustrating an example process for measuring entity extraction complexity in accordance with one or more embodiments.

FIG. 4 is a flowchart illustrating an example process 400 for measuring entity extraction complexity in accordance with one or more embodiments. Process 400 is carried out by an extraction complexity determination module, such as extraction complexity determination module 104 of FIG. 1 or extraction complexity determination module 200 of FIG. 2, and can be implemented in software, firmware, hardware, or combinations thereof. Process 400 is shown as a set of acts and is not limited to the order shown for performing the operations of the various acts. Process 300 is an example process for measuring entity extraction complexity; additional discussions of measuring entity extraction complexity are included herein with reference to different figures.

In process 400, an undirected graph is built based on the named entity input and a set of documents (act 402). The graph includes vertices as well as edges between the vertices, as discussed above.

Scores of selected vertices in the graph are incremented by propagating the relevance of vertices or nodes through the graph (act 404). These selected vertices are the vertices that are touched when a pulsed sense hint node is propagated through the graph, as discussed above.

Scores of vertices in the graph are normalized to obtain a language model (act 406). The language model represents words and strengths of the associations of the words with the target sense of the named entity input. This normalization can be performed in a variety of different manners, as discussed above.

The language model obtained in act 406 is refined using a clustering technique (act 408). A variety of different clustering techniques can be used as discussed above.

The results of the clustering technique in act 406 are used to determine a measure of the extraction complexity for the named entity input (act 410). Different techniques can be used to determine the extraction complexity based on the clustering, as discussed above.

In one or more embodiments, the measuring entity extraction complexity is performed in two parts: a graph-based spreading activation part and a clustering part. The graph-based spreading activation part is performed by, for example, acts 402, 404, and 406. The clustering part is performed by, for example, act 408.

Various discussions herein discuss measuring entity extraction complexity using a graph-based spreading activation technique followed by a clustering technique. In other embodiments, however, no such clustering technique is used. Rather, the entity extraction complexity is measured using just the graph-based spreading activation technique. In such embodiments, the extraction complexity (e.g., as generated by clustering module 204 as discussed above) is based on an average score of documents rather than clusters.

Figure 5:
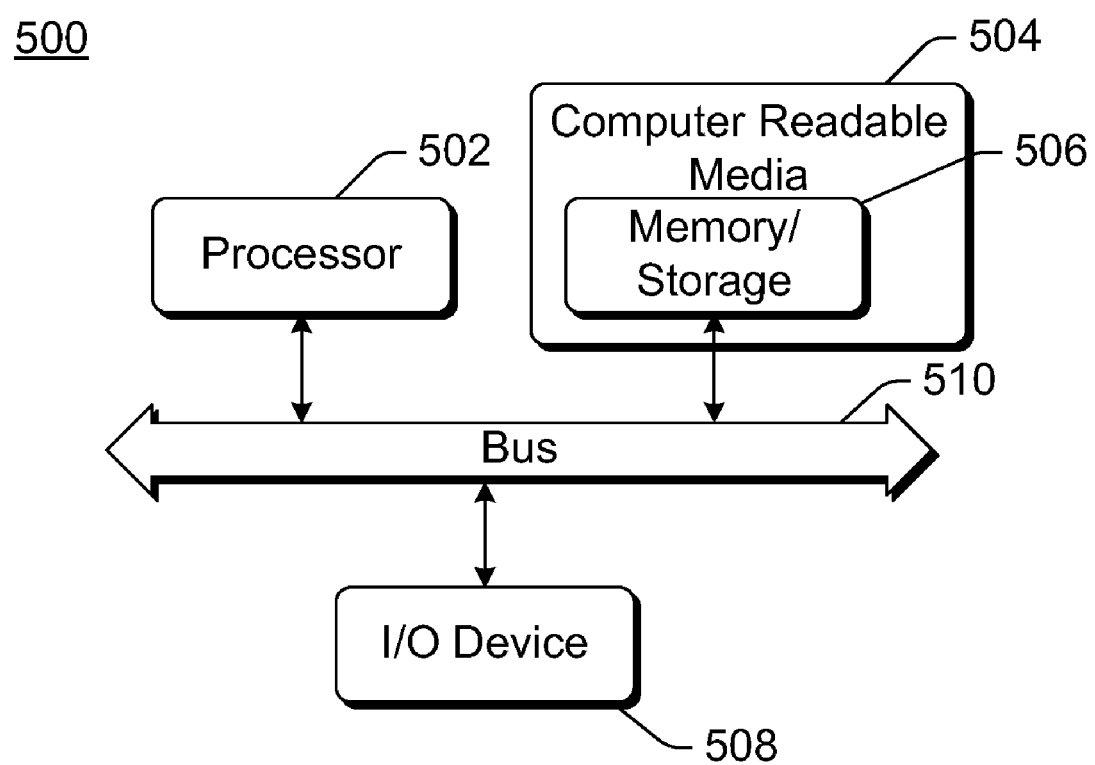
FIG. 5 illustrates an example computing device that can be configured to implement the measuring entity extraction complexity in accordance with one or more embodiments.

FIG. 5 illustrates an example computing device 500 that can be configured to implement the measuring entity extraction complexity in accordance with one or more embodiments. Computing device 500 can be, for example, computing device 102 of FIG. 1.

Computing device 500 includes one or more processors or processing units 502, one or more computer readable media 504 which can include one or more memory and/or storage components 506, one or more input/output (I/O) devices 508, and a bus 510 that allows the various components and devices to communicate with one another. Computer readable media 504 and/or one or more I/O devices 508 can be included as part of, or alternatively may be coupled to, computing device 500. Bus 510 represents one or more of several types of bus structures, including a memory bus or memory controller, a peripheral bus, an accelerated graphics port, a processor or local bus, and so forth using a variety of different bus architectures. Bus 510 can include wired and/or wireless buses.

Memory/storage component 506 represents one or more computer storage media. Component 506 can include volatile media (such as random access memory (RAM)) and/or non-volatile media (such as read only memory (ROM), Flash memory, optical disks, magnetic disks, and so forth). Component 506 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 502. It is to be appreciated that different instructions can be stored in different components of computing device 500, such as in a processing unit 502, in various cache memories of a processing unit 502, in other cache memories of device 500 (not shown), on other computer readable media, and so forth. Additionally, it is to be appreciated that the location where instructions are stored in computing device 500 can change over time.

One or more input/output devices 508 allow a user to enter commands and information to computing device 500, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 5. The features of the measuring entity extraction complexity techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented in a computing device, the method comprising:
   receiving a named entity input;
   identifying a target sense for which the named entity input is to be extracted from a set of documents; and
   generating by the computing device, based at least in part on both the named entity input and the set of documents, an extraction complexity feature indicating how difficult it is deemed to be to identify the named entity input for the target sense in the set of documents by:
   performing a graph-based spreading activation technique to generate a language model including:
   building an undirected graph based on the named entity input and the set of documents, the undirected graph including multiple vertices and multiple edges,
   incrementing scores of selected ones of the multiple vertices by propagating a relevance of one or more of the multiple vertices through the undirected graph, and
   normalizing, after incrementing the scores of the selected ones of the multiple vertices, scores of the multiple vertices to obtain the language model;
   performing a clustering technique to refine the language model resulting in a refined language model that includes multiple clusters each including one or more documents; and
   determining an extraction complexity measurement for the named entity input by:
   determining a relatedness of each of the multiple clusters in the refined language model to the target sense;
   assigning, for each of the multiple clusters, a score to the cluster based on the relatedness of the cluster to the target sense;
   determining an average cluster score that is an average of the scores of the multiple clusters;
   identifying, as a value $|C^*|$, a number of documents in clusters having a score greater than the average cluster score;
   identifying, as a value $|D|$, a number of documents in the set of documents; and
   determining the extraction complexity measurement as:

$$\frac{1}{|C^*|/|D|}.$$

2. A method as recited in claim 1, further comprising providing the extraction complexity feature to a named entity recognition module that identifies the named entity input in the set of documents based at least in part on the extraction complexity feature.

3. A method as recited in claim 1, wherein the named entity input is received from a source, and the method further comprises receiving the target sense from the source.

4. A method as recited in claim 1, wherein the computing device is included in an open system having no knowledge of all the different senses in which the named entity input can be used.

5. A method implemented in a computing device, the method comprising:
   receiving a named entity input from a source;
   identifying a target sense for the named entity input, wherein the target sense is a particular desired usage of the named entity input in a set of documents; and
   generating by the computing device, based at least in part on both the named entity input and the set of documents, an extraction complexity measurement that indicates how difficult it is deemed to be to identify the named entity input in the set of documents for the target sense, the generating the extraction complexity measurement comprising:
      performing a graph-based spreading activation technique to generate a language model by:
         building an undirected graph based on the named entity input and the set of documents, the undirected graph including multiple vertices and multiple edges,
         incrementing scores of selected ones of the multiple vertices by propagating a relevance of one or more of the multiple vertices through the undirected graph, and
         normalizing, after incrementing the scores of the selected ones of the multiple vertices, scores of the multiple vertices to obtain the language model;
      performing a graph-based clustering technique to refine the language model, wherein the refined language model includes multiple clusters; and
      determining the extraction complexity measurement based on the refined language model, wherein the determining the extraction complexity measurement comprises identifying a number of documents in clusters of the multiple clusters having a score greater than an average cluster score.

6. A method as recited in claim 5, further comprising providing the extraction complexity measurement to a named entity recognition module that identifies the named entity input in the set of documents based at least in part on the extraction complexity measurement.

7. A method as recited in claim 5, wherein the identifying the target sense comprises receiving the target sense from the source.

8. A method as recited in claim 5, wherein the computing device is included in an open system in which the computing device has no knowledge of all the different senses in which the named entity input can be used.

9. One or more computer storage media having stored thereon multiple instructions that, when executed by one or more processors of a computing device, cause the one or more processors to:
   receive a named entity input from a source;
   identify a target sense for the named entity input, wherein the target sense is a particular desired usage of the named entity input in a set of documents; and
   generate, based at least in part on both the named entity input and the set of documents, an extraction complexity measurement that indicates how difficult it is deemed to be to identify the named entity input in the set of documents for the target sense, wherein to generate the extraction complexity measurement is to:
      perform a graph-based spreading activation technique to generate a language model by:
         building an undirected graph based on the named entity input and the set of documents, the undirected graph including multiple vertices and multiple edges,
         incrementing scores of selected ones of the multiple vertices by propagating a relevance of one or more of the multiple vertices through the undirected graph, and
         normalizing, after incrementing the scores of the selected ones of the multiple vertices, scores of the multiple vertices to obtain the language model;
      perform a graph-based clustering technique to refine the language model, wherein the refined language model includes multiple clusters; and
      determine the extraction complexity measurement based on the refined language model, wherein to determine the extraction complexity measurement comprises to identify a number of documents in clusters of the multiple clusters having a score greater than an average cluster score.

10. One or more computer storage media as recited in claim 9, wherein the multiple instructions further cause the one or more processors to provide the extraction complexity measurement to a named entity recognition module that identifies the named entity input in the set of documents based at least in part on the extraction complexity measurement.

11. One or more computer storage media as recited in claim 9, wherein to identify the target sense is to receive the target sense from the source.

12. One or more computer storage media as recited in claim 9, wherein the computing device is included in an open system in which the computing device has no knowledge of all the different senses in which the named entity input can be used.

* * * * *